United States Patent [19]

Mozer

[11] Patent Number: 5,331,451
[45] Date of Patent: Jul. 19, 1994

[54] OPTICAL TIME-DIVISION MULTIPLEXING

[75] Inventor: Albrecht Mozer, Burghausen, Fed. Rep. of Germany

[73] Assignee: Alcatel N.V., Amsterdam, Netherlands

[21] Appl. No.: 907,922

[22] Filed: Jul. 6, 1992

[30] Foreign Application Priority Data

Jul. 6, 1991 [DE] Fed. Rep. of Germany ....... 4122439

[51] Int. Cl.$^5$ .................. H04J 14/02; H04J 14/08
[52] U.S. Cl. ............................ 359/139; 359/123; 359/128
[58] Field of Search ............... 370/8, 10, 109; 359/123, 139, 128

[56] References Cited

U.S. PATENT DOCUMENTS 5,115,331  5/1992  Gookin ................. 359/139

FOREIGN PATENT DOCUMENTS

| 0137 | 4/1985 | European Pat. Off. | |
| 3337282 | 4/1985 | Fed. Rep. of Germany | |
| 0157128 | 7/1986 | Japan | 359/139 |
| 2113049 | 7/1983 | United Kingdom | 359/123 |

OTHER PUBLICATIONS

Habara et al., "Optical Switching Networks Using Tree-Structured Waveguide Optical Switches," Electronics and Communications in Japan 70, Nov. 1987, No. 11, Part I, pp. 118-127.

Cada et al., "Two-Wavelength Optical Switching in a GaAs Multiple Quantum Well Directional Coupler," Applied Physics Letters 56 May 21, 1990, No. 21, pp. 2080-2082.

Tucker et al., "Optical Time-Division Multiplexed Fiber Transmission Using Ti:LiNbO$_3$ Waveguide Switch/Modulators" IEEE/IEICE Global Telecommunications Conference, Nov. 15-18, 1987, Tokyo, Japan, pp. 1302-1304.

Tucker et al., "Optical Time-Division Multiplexing For Very High Bit-Rate Transmission," Journal of Lightwave Technology, Nov. 1988, No. 11, pp. 1737-1749.

Tucker et al., "16 Gbit/s Fibre Transmission Experiment Using Optical Time-Division Multiplexing", Electronic Letters, vol. 23, No. 24, pp. 1270-1271, Nov. 19, 1987.

*Primary Examiner*—Leslie Pascal
*Attorney, Agent, or Firm*—Spencer, Frank & Schneider

[57] ABSTRACT

Optical time-division multiplexing of two or more digital optical input signals applied to an optical multiplex element to produce a single optical output signal is performed. In the multiplex element, the input signals are optically switched through in alternation, a through-switching time interval being shorter than the duration of a pulse of the input signal. An optical time-division multiplexer has at least one multiplex element to which at least two optical signal are input, the signals having carriers of different wavelengths. The signals are connected to an optical signal output via a junction. The signals can be switched through to the signal output in alternation by a switchable filter.

18 Claims, 3 Drawing Sheets

OPTICAL TIME-DIVISION MULTIPLEXING

CROSS REFERENCE TO RELATED APPLICATION

This application claims the priority of application Ser. No. P 41 22 439.6, filed Jul. 6, 1991, in the Federal Republic of Germany, the subject matter of which is incorporated herein by reference.

BACKGROUND OF THE INVENTION

1. Field of the Invention

The invention relates to a method for optical time-division multiplexing and to an optical time-division multiplexer, having at least one multiplex element, in which at least two optical inputs are connected via a junction to an optical signal output, and having an optical transmitters.

2. Background Information

In optical digital transmission systems, the bit rate is rising continuously. Target values for the future are on the order of 30 to 50 Gbit per second. Since with known direct-modulated semiconductor lasers, such target values are attainable only with very great difficulty, signal streams generated by individual semiconductor lasers are combined in an optical time-division multiplexer to make a signal stream with a higher bit rate.

One such system is known from Electronics Letters, Nov. 19, 1987, Vol. 23, No. 24, pages 1270 and 1271. In the known system, an active 3 dB Ti:LiNbO$_3$ switch is used as a time-division multiplexer.

In the known system, the signal streams are generated by so-called phase-coupled semiconductor lasers, which have a predefined phase relationship with one another. Phase-coupled semiconductor lasers of this kind have the characteristic that although they produce very short pulses, nevertheless two successive pulses are spaced apart by a time interval that is approximately 10 times as long as the pulse duration. The pulses generated have a pulse duration of 15 ps and are switched through in time intervals having a length on the order of 62.5 ps. The various pulses are in a phase relationship such that they are distributed uniformly. Accordingly, only the particular time interval in which the pulse is located needs to be switched through at a given time. This system runs up against its limits if two successive pulses of a signal stream follow one another directly, without a long time interval between them.

SUMMARY OF THE INVENTION

The object of the invention is to provide a method in which the bit rate can be increased still further, and to create an optical multiplexer and an associated system with which the method can be performed.

This object is attained by a method of optical time-division multiplexing in which a through-switching time interval is shorter than the duration of a pulse of the input signal. In addition, according to an embodiment of the invention, an optical time-division multiplexer having at least one multiplex element, in which at least two optical signal inputs at which are applied signals having carriers of different wavelengths, the signal inputs are connected to an optical signal output via a junction, and the signals applied to the signal inputs can be switched through to the signal output in alternation by a switchable filter.

BRIEF DESCRIPTION OF THE DRAWINGS

Exemplary embodiments are described below in conjunction with FIGS. 1-6 in which.

DETAILED DESCRIPTION OF THE PREFERRED EMBODIMENTS

The method according to the invention is described by way of example in combination with the optical multiplexer MUX, which is also considered inventive on its own and is described below, and which is especially suitable for the performance of the method, but its use is not limited to performing the method. In principle, the method of the invention can be carried out with other optical multiplexers as well, as long as they have a fast enough switching time for short pulses.

The description of the multiplexer MUX assumes that the duration of a bit-clock period is equivalent to the pulse duration of a signal stream to be multiplexed. For the method of the invention, the pulse duration may certainly be shorter than the duration of one bit-clock period. A definitive factor is that the pulse duration is shortened in the multiplexing, and as a result, the bit rate of a transmission system in which the method is used can be increased.

Figure 1:
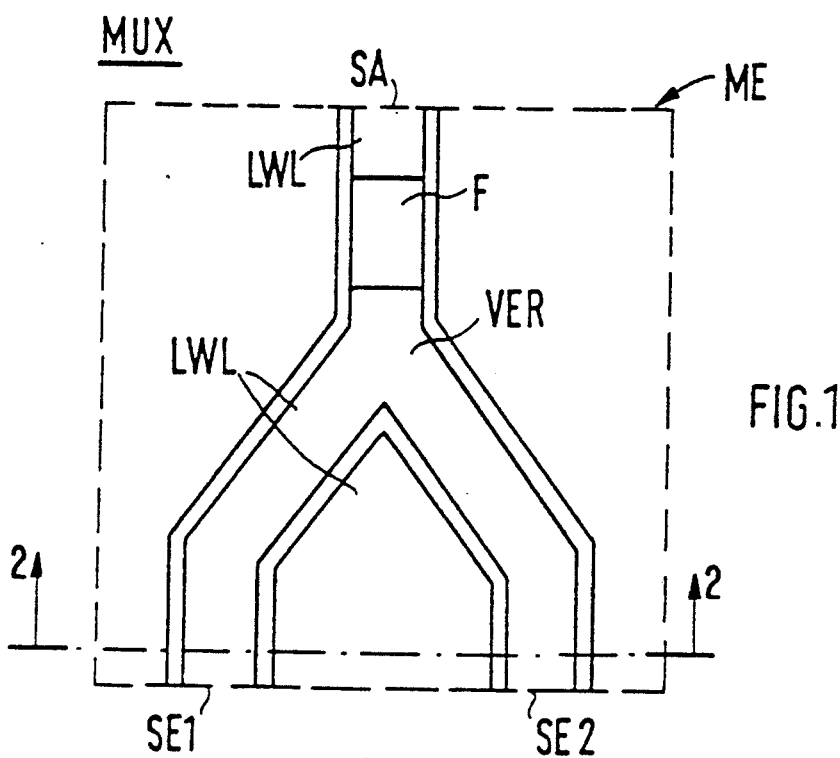
FIG. 1 is a plan view of a multiplex element according to the invention.

In FIG. 1, a multiplex element ME according to the invention is shown in plan view in an optical time-division multiplexer MUX. The multiplex element ME has two signal inputs SE1, SE2 and one signal output SA. The signal inputs SE1 and SE2 are connected to the signal output SA by optical wave guides LWL via a junction VER. A switchable filter F is disposed between the junction VER and the signal output SA. Signals S1 and S2 with carriers of different wavelengths, lambda 1, lambda 2, are applied to the signal inputs SE1 and SE2. By switching the filter F, one signal or the other can be passed through.

Figure 2:
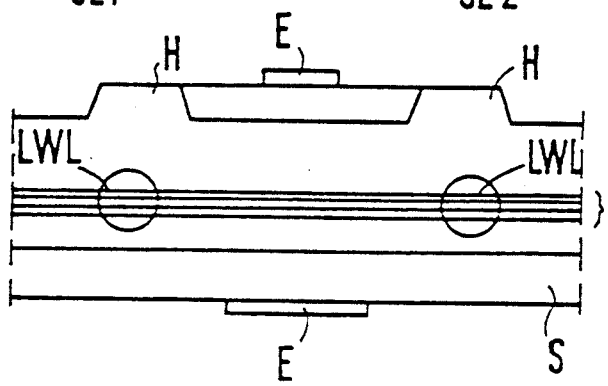
FIG. 2 is a sectional view along line AB of the multiplex element of FIG. 1 according to the invention.

In FIG. 2, the layer structure of a multiplex element ME according to the invention is shown in a section taken along the line AB of FIG. 1. In a known manner, in the form of planar integrated optical wave guides, the optical wave guides LWL are applied to a substrate S in a layer sequence. As shown hereinafter, the optical wave guides LWL are advantageously structured as a multiple-quantum-well layer sequence. The beam course is determined, also in a known manner, by the remaining layer structure. In the exemplary embodiment, the light is given its preferential propagation direction by a raised portion H of the layer sequence, above the region provided for the optical wave guides LWL. In a different manner, as known from European Patent Disclosure 01 37 851 B1, for instance, the optical wave guides LWL may also be built up from so-called PLZT layers, which comprise a combination of the elements (Pb, La) (Zr, Ti) O₃, on the basis of LiNbO₃ layers or optical polymers as optical wave guides.

The use of a multiple-quantum-well layer sequence as a switchable filter F has the advantage that, depending on the type and structure of the multiple-quantum-well layer sequence, the light is absorbed over a narrow band, and the absorption range, which together with the passband covers the wavelength spectrum, can be shifted by the application of an electrical field. This advantage is exploited in the time-division multiplexer according to the invention, and the layer sequence of each multiplex element ME in the region between the junction VER and the signal output SA is surrounded by two electrodes E encompassing the layer sequence. By the application of an electrical voltage, the absorption range of the multiple-quantum-well layer structure located between the electrodes can be switched through from absorption to transmission for one wavelength.

Should the requisite degree of absorption not be attained in a particular version of the invention, then the surface area of the electrode can be increased, beginning at the signal output SA and extending across the junction VER as far as the signal inputs SE1 and SE2. However, increasing the electrode surface area makes for a high electrical capacitance of the filter F, with the known attendant disadvantages, such as longer switching times.

Figure 3A:
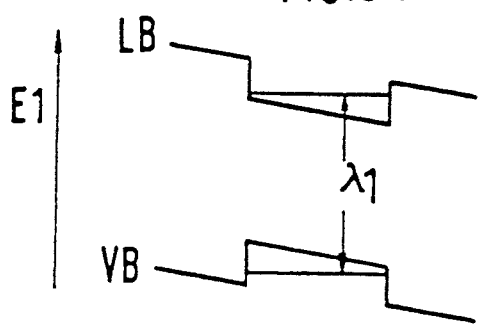
FIGS. 3A and 3B show possible band transitions of a filter with a multiple quantum well layer sequence.
Figure 3B:
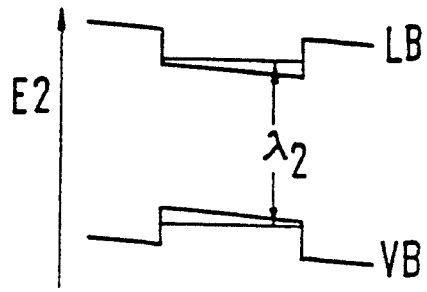

The mode of operation of the filter F in the form of a multiple-quantum-well layer sequence is shown in FIGS. 3A and 3B. The figures show the upper edge of the valence band VB and the lower edge of the conduction band LB. FIG. 3A shows the state with a predetermined electrical field E1 applied, hereinafter called switching state 1; FIG. 3B shows the state with another, likewise predetermined field E2, hereinafter called switching state 2. The fields are generated by the application of an electrical voltage to the electrodes. Varying the electrical field causes the energy level of the multiple-quantum-well layer sequence to vary. This means that in switching state 1, the multiple-quantum-well layer sequence absorbs light having a wavelength of lambda 1, and in switching state 2, it absorbs light having the wavelength of lambda 2; the wavelengths may for example be lambda 1=1500 nm and lambda 2=1510 nm. Depending on the type of multiple-quantum-well layer sequence selected, the absorption range has a width of 3 nm, for example.

The use of a multiple-quantum-well layer sequence as a switchable filter F thus has the advantage that signal streams can be time-division multiplexed even if the carrier wavelengths are close together.

The use of the multiplex element ME according to the invention requires that signal streams S1, S2 having different carrier wavelengths lambda 1, lambda 2 be applied to the signal inputs SE1 and SE2. To describe the operation, it will now be assumed that a signal stream S1 having an optical carrier of wavelength lambda 1=1500 nm enters the signal input SE1, and a signal stream having an optical carrier of wavelength lambda 2=1510 nm enters the signal input SE2. If a first voltage $U_{min}$ is applied to the switchable filter F, then the filter F is in switching position 1; that is, the signal stream S1 is absorbed, and the filter F is transparent for the signal stream 2; that is, the signal stream S2 is switched through. If a voltage $U_{max}$ is applied to the filter F, then the filter F is in switching position 2; that is, the signal stream 1 is switched through, and the signal stream 2 is absorbed.

The object of the multiplex element ME is to multiplex the two signal streams S1 and S2, or in other words to interlace them, thereby increasing the bit rate. To this end, the duration of a pulse, which here equals the duration of one bit-clock period T of the entering signals streams S1, S2, is halved to the duration T/2 of the bit-clock period of the outgoing signal stream S1,2, by the application of a sine wave voltage having a frequency f=1/T to the electrodes E of the filter F. As a result, the two signal streams are interlaced in terms of time, and they appear united as the signal S1,2 at the signal output.

Figure 4A:
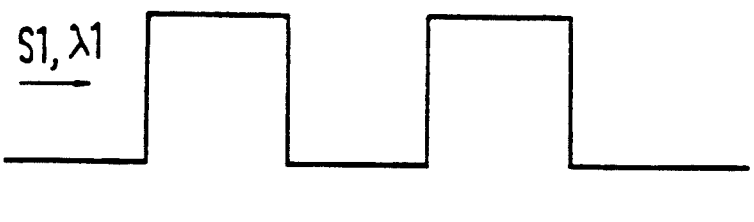
FIGS. 4A–4D show the combining of the entering signal streams by an applied, sine-wave electrical field, to make one outgoing signal stream.
Figure 4B:
Figure 4C:
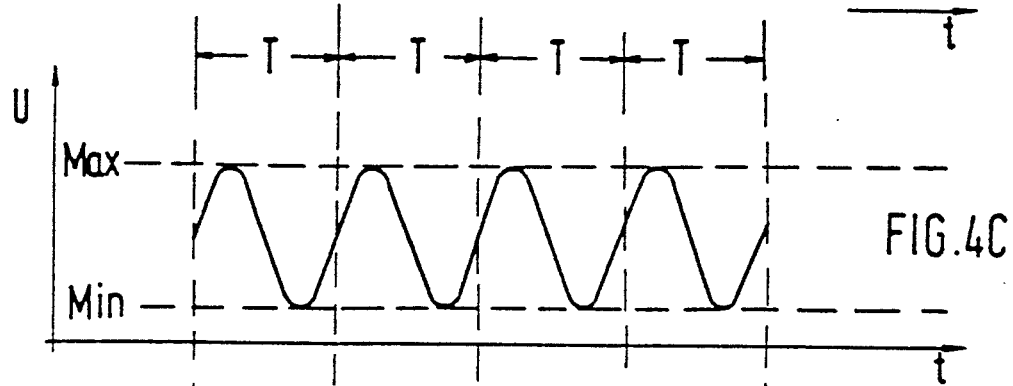
Figure 4D:

If the two signal streams S1 and S2 and the sine-wave voltage are not in phase, then as shown in FIGS. 4A-4B, a one-time alternating switching through of the signal streams S1 and S2 takes place, during the transmission duration of one data bit. In FIG. 4A, the digital signal stream S1 is shown, which beginning at time $t_0$ contains a logical 1, 0, 1 and 0, in that order. In FIG. 4B, the digital signal stream S2 is shown, which beginning at time $t_0$ contains a logical 1, 0, 0 and 1, in that order. In FIG. 4C, the sine-wave voltage is shown. In the first time interval $t_0-t_1$, the filter F is in switching position 2, that is, the logical 1 of the signal stream S1 is switched through in the first half clock period; during the second half, the filter F is in switching position 1, that is, the logical 1 of the other signal stream S2 is switched through. Switching through the other bits of the signal streams takes place as shown in FIGS. 4A-4D; during the first half of one bit-clock period of duration T, it is always the signal stream S1 that is switched through, while during the second half it is always the signal stream S2 that is switched through, and in this way the outgoing signal stream S1,2 having a duration of the bit-clock period T'=T/2 is generated.

Figure 5:
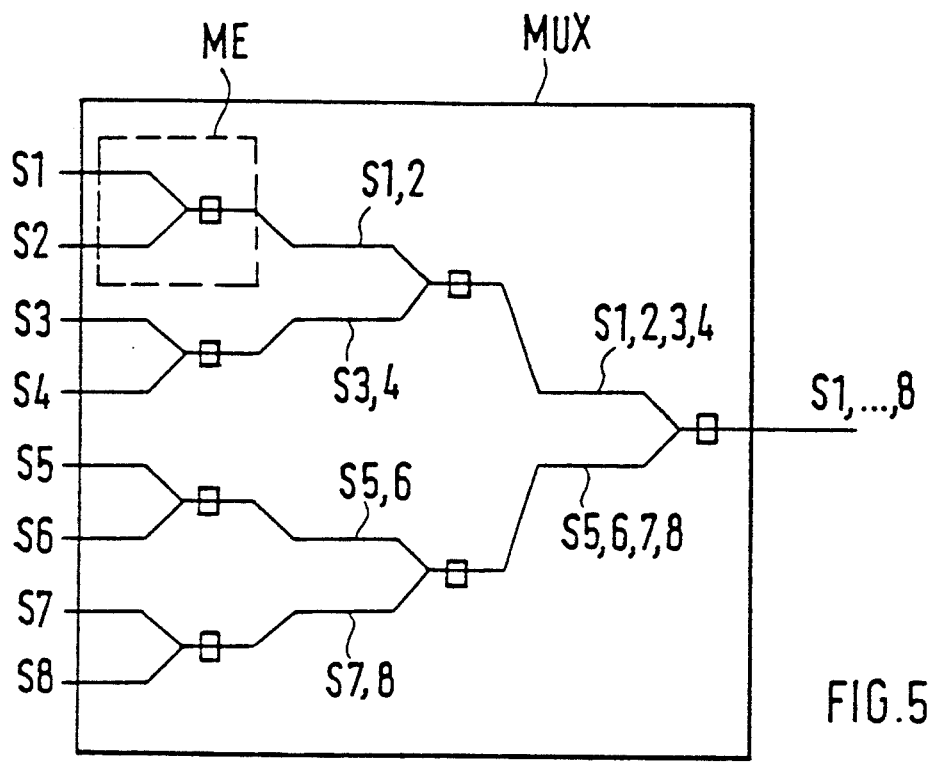
FIG. 5 shows an exemplary embodiment of a time-division multiplexer.

In FIG. 5, an exemplary embodiment of an optical time-division multiplexer MUX is shown having eight signal inputs, at which signals S1-S8 are applied; the signals S1, S3, S5 and S7 have a carrier with a wavelength of lambda 1, while the signals S2, S4, S6 and S8 have a carrier with a wavelength of lambda 2. The time-division multiplexer MUX shown comprises seven multiplex elements ME, which are connected in a cascade in three stages. The signal inputs of the multiplex elements of the first stage represent the signal inputs of the time multiplexer MUX. The signal output of the multiplex element ME of the last, in this case the third, stage represents the output of the time-division multiplexer MUX. The signal outputs of the multiplex elements of the first stage are each connected to one signal input of a multiplex element of the second stage. The outputs of the multiplex elements of the second stage are connected to the inputs of the multiplex element of the third stage. The signals S1-S8 have a bit-clock period duration T. In the first stage, they are combined into the multiplex signals S1,2, S3,4, S5,6, and S7,8, with a bit-clock period duration T/2. In the second stage, these multiplex signals are combined into multiplex signals S1,2,3,4, and S5,6,7,8, with a bit-clock period duration T/4, and these two multiplex signals are combined in the third stage into a multiplex signal S1-8, with a bit-clock period duration T/8. A sine-wave oscillation with a frequency $f_1 1/T$ is applied to the filters F of the first stage, a sine-wave oscillation with a frequency $f_2=2/T$ is applied to those of the second stage, and a sine-wave oscillation with a frequency $f_3 = 4/T$ is applied to those of the third stage.

Figure 6:
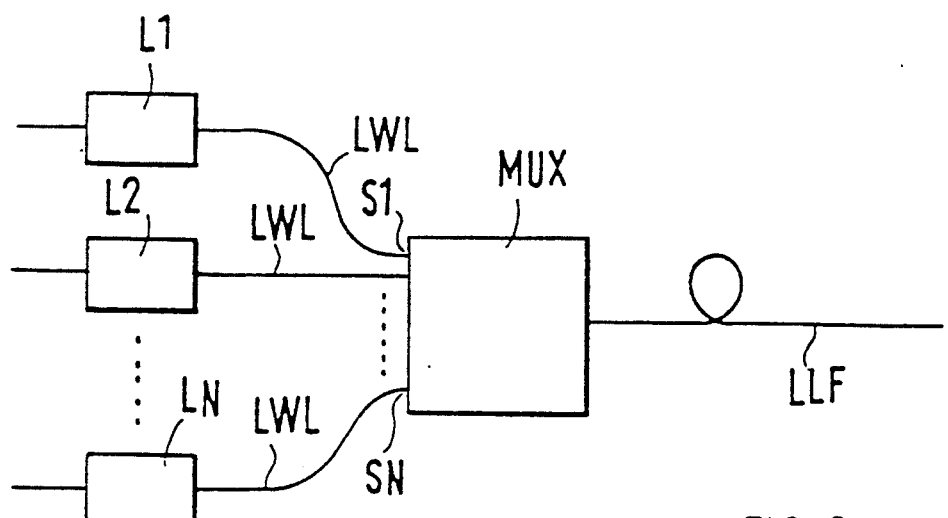
FIG. 6 shows a transmission unit having a time-division multiplexer according to the invention.

FIG. 6 shows an exemplary embodiment of an optical transmitter with an optical time-division multiplexer MUX, which has N inputs, which are connected to N lasers, as light sources, via integrated optical wave guides LWL, and which has one signal output, which is connected to a second transmission device (not shown) via an optical fiber LLF.

The multiplex element may also have three or more signal inputs. In that case, three or more signals are interlaced in one multiplex element to make one output signal. It is then necessary for signal streams having a corresponding number of carriers of different wavelengths to enter each signal input and for the filter F to be capable of passing only one signal stream. A suitable combination of filter elements which make the particular desired passband possible can also be selected for that purpose.

It will be understood that the above description of the present invention is susceptible to various modifications, changes and adaptations, and the same are intended to be comprehended within the meaning and range of equivalents of the appended claims.

What is claimed is:

1. A time-division optical multiplexer system, having a plurality of multiplexer elements the optical multiplexer elements comprising:
   a first optical waveguide for receiving and transmitting a first optical signal having a first optical carrier wavelength;
   a second optical waveguide for receiving and transmitting a second optical signal having a second optical carrier wavelength; and
   a third optical waveguide for alternately receiving the first and second optical signals and providing an optical output signal;
   said first and second optical waveguides being joined together at a junction;
   said third optical waveguide being coupled to said junction by switchable filter means for alternately passing one of the first and second optical signals;
   wherein:
      the plurality of multiplexer elements are arranged in a plurality of cascaded groups, each group having twice the elements of a following group;
      inputs of the elements in each respective group are connected to outputs of the elements in a respective preceding group;
      the switchable filter means of the elements of a respective group are controlled in synchronism by respective control signals; and
      the switchable filter means of the elements in each respective group are controlled by a control signal having a frequency twice the frequency of a following group.

2. An optical time-division multiplexer comprising:
   at least one multiplex element having inputs for receiving at least two optical signals, the signals having carriers of different wavelengths, the inputs being connected to an optical signal output via a junction, the element further having switchable filter means for switching the signals applied to the inputs to the signal output in alternation, wherein the multiplex element is controlled so that a switching time interval is shorter than a pulse duration of the input signals.

3. The optical time-division multiplexer of claim 2, wherein the pulse duration of the optical input signals is less than 50 ps.

4. The optical time-division multiplexer of claim 2, wherein for each multiplex element, the at least two optical signals are two digital optical signals, a switching signal period is equal to the input signals' pulse duration during multiplexing, and a pulse duration of the output of the multiplexer is halved during multiplexing.

5. The optical time-division multiplexer of claim 2, wherein the switchable filter means is disposed between the junction and the signal output.

6. The optical time-division multiplexer of claim 2, wherein the input signals to be multiplexed are digital signals, and the switchable filter means is controlled by a periodic alternating voltage of frequency $f = 1/T$, where T represents the duration of one bit-clock period of the input signals to be multiplexed.

7. The optical time-division multiplexer of claim 2, wherein the multiplex element has two signal inputs for receiving respective signals, the respective signals each having a different respective carrier wavelength, and wherein the switchable filter means alternatingly blocks a respective one of the carrier wavelengths.

8. The optical time-division multiplexer of claim 2, wherein a plurality of multiplex elements are disposed in a cascade, and wherein one signal output of each multiplex element is connected to one signal input of a following multiplex element.

9. The optical time-division multiplexer of claim 2, further comprising a plurality of optical wave guides for transmitting the optical signals, wherein the optical waveguides are planar optical wave guides.

10. The optical time-division multiplexer of claim 2, wherein the switchable filter means has a multiple-quantum-well structure, and has a passband switchable by the application of an electrical field.

11. The optical time-division multiplexer of claim 2, further comprising optical wave guides for transmitting the optical signals, the optical waveguides substantially comprising semiconductor layers.

12. An optical transmitter having an optical time-division multiplexer of claim 2, wherein individual integrated semiconductor elements are provided.

13. An optical multiplexer element comprising:
   a first optical waveguide for receiving and transmitting a first optical signal having a first optical carrier wavelength;
   a second optical waveguide for receiving and transmitting a second optical signal having a second optical carrier wavelength; and
   a third optical waveguide for alternately receiving the first and second optical signals and providing an optical output signal; and
   switchable filter means for alternately passing one of the first and second optical signals;
   wherein said first and second optical waveguides are joined together at a junction, and wherein said third optical waveguide is coupled to said junction by said switchable filter means for alternately passing one of the first and second optical signals, wherein the multiplexer element is controlled so that a switching time interval is shorter than a pulse duration of the first and second optical signals.

14. The opticalmultiplexer element according to claim 13, wherein said optical multiplexer, including said first, second and third optical waveguides, said junction, and said switchable filter means, is formed as an integrated optics layer structure on a substrate.

15. The optical multiplexer element according to claim 14, wherein at least said switchable filter means is formed as a multiple-quantum-well layer sequence, said switchable filter means including electrodes encompassing the multiple-quantum-well layer sequence, for connection to an external source of control signals whereby the alternate passing of the first and second optical signals by said switchable filter means is controlled.

16. The optical multiplexer element according to claim 14, wherein at least said first, second and third optical waveguides are formed of layers of at least one of PLZT, LiNbO$_3$, and optical polymers.

17. An optical multiplexer system, having a plurality of multiplexer elements according to claim 13, wherein the plurality of multiplexer elements are arranged in a plurality of groups, outputs of the multiplexer elements of one group being connected to inputs of the multiplexer elements of a succeeding group.

18. A time-division optical multiplexer system, having a plurality of multiplexer elements according to claim 13, wherein:
  the plurality of multiplexer elements are arranged in three cascaded groups, a first group having four elements, a second group having two elements, and a third group having one element;
  inputs of the element in the third group are connected to outputs of the elements in the second group, and inputs of the elements in the second group are connected to outputs of the elements in the first group;
  the switchable filter means of the elements of a respective group are controlled in synchronism by respective control signals;
  the switchable filter means of the elements in the first group are controlled by a control signal having a first frequency, the switchable filter means of the elements in the second group are controlled by a control signal having a frequency twice the first frequency, and the switchable filter means of the element in the third group are controlled by a control signal having a frequency four times the first frequency.

* * * * *